United States Patent
Lung et al.

(10) Patent No.: US 7,422,264 B1
(45) Date of Patent: Sep. 9, 2008

(54) VEHICLE SEAT ADJUSTING APPARATUS

(75) Inventors: Ching-Yung Lung, Hsinchu County (TW); Yun-Chin Su, Taipei County (TW)

(73) Assignee: Pro-Glory Enterprise Co., Ltd., Taipei (TW)

( * ) Notice: Subject to any disclaimer, the term of this patent is extended or adjusted under 35 U.S.C. 154(b) by 0 days.

(21) Appl. No.: 11/987,851

(22) Filed: Dec. 5, 2007

(30) Foreign Application Priority Data

Aug. 16, 2007 (TW) .............................. 96213590 U

(51) Int. Cl.
*B60N 2/06* (2006.01)

(52) U.S. Cl. .............. 296/65.01; 296/65.12; 296/65.15; 297/344.24

(58) Field of Classification Search .............. 296/65.01, 296/65.13, 65.06, 65.07, 65.11, 65.12, 65.15; 297/344.1, 344.11, 344.21, 344.24

See application file for complete search history.

(56) References Cited

U.S. PATENT DOCUMENTS

| 4,468,051 A * | 8/1984 | Kobayashi | .................. 280/751 |
| 2006/0138834 A1 * | 6/2006 | Wegener | ..................... 297/314 |

* cited by examiner

*Primary Examiner*—Joseph D Pape
(74) *Attorney, Agent, or Firm*—Reed Smith LLP; Stanley P. Fisher, Esq.; Juan Carlos A. Marquez, Esq.

(57) ABSTRACT

The invention discloses a vehicle seat adjusting apparatus including a seat base, a mechanically operated first transmission device, a first supporting plate, a mechanically operated second transmission device, and a second supporting plate. When the first transmission device is operated to be stationary, the second transmission device is capable of being operated to rotate a rotation shaft thereof to rotate the second supporting plate with respect to the first supporting plate. The second transmission device also actuates a first gear thereof to meshably rotate on a stationary first rack member of the first transmission device, such that the second supporting plate, together with the first supporting plate, moves with respect to the seat base along a direction defined by the first rack member.

9 Claims, 6 Drawing Sheets

VEHICLE SEAT ADJUSTING APPARATUS

BACKGROUND OF THE INVENTION

1. Field of the Invention

The invention relates to a vehicle seat adjusting apparatus and, more particularly, to a vehicle seat adjusting apparatus with vehicle seat that can be rotated and moved at the same time.

2. Description of the Prior Art

With the progress of science and technology and the right of disabled employees are gaining respect, some manufacturers continuously develop vehicle products for the disabled employees to move conveniently. However, most of the products are developed by foreign manufacturers and belong to some specific models of particular brands of vehicle products. Therefore, the prices of the products are usually rather high and users must pay much more for those vehicles.

Because the space within an ordinary vehicle is smaller and the doors of the vehicle are also narrower, there is a requirement of a special vehicle seat adjusting apparatus through which the vehicle seats can be rotated and moved to push out the doors in order to be integrated with a matching wheelchair, such that a disabled employee is able to move in and out of the vehicle conveniently.

In prior arts, several kinds of vehicle seat adjusting apparatus have been disclosed, such as those of R.O.C Patent Number 388,022 and France Patent Number 2776583. Installing both these two patents require larger vehicle space, so they can not adapt to small vehicles. In addition, although Japan Patent Publication Number 2002-337577 requires smaller vehicle space, it takes a stronger structure in design, so both the cost and the complexity of installation will increase. Moreover, Japan Patent Publication Number 2002-065748 and 2003-127726 use linkages to allow vehicle seats to rotate and move at the same time. But the length of the linkages are fixed, the linkages can not adapt to vehicles of different kinds flexibly. Furthermore, most of vehicle seat adjusting apparatuses need additional devices or elements installed to achieve the simple function of adjusting the vehicle seat forward or backward.

Accordingly, one scope of the invention is to provide a vehicle seat adjusting apparatus to solve the above-mentioned problems.

SUMMARY OF THE INVENTION

One scope of the invention is to provide a vehicle seat adjusting apparatus which uses two sets of mechanically operated transmission device to allow the second supporting plate and the first supporting plate to move together with respect to the seat base while the second supporting plate rotates. Thus, even constrained by smaller vehicle space, the vehicle seat adjusting apparatus is capable of smoothly moving the vehicle seat, which is mounted on the second supporting plate, out of the vehicle to integrate with the matching wheelchair, such that a disabled employee is able to move in and out of the vehicle conveniently. Besides, the invention requires no additional devices or elements to achieve the common function of adjusting the vehicle seat forward or backward. Moreover, because of the simple structure, lower cost, and easiness of assembling of the vehicle seat adjusting apparatus, users can be provided with cheaper prices, much more convenient installation, and operating experience. Also, by adjusting the gear ratios of the transmission device, the vehicle seat adjusting apparatus is thus able to adapt to different kinds of vehicles and has more flexibility in design.

The vehicle seat adjusting apparatus according to an embodiment of the invention includes a seat base, a mechanically operated first transmission device, a first supporting plate, a mechanically operated second transmission device, and a second supporting plate. The seat base is secured to a floorboard of a vehicle therein. The mechanically operated first transmission device is substantially mounted on the seat base and includes an actuating first rack member. The first supporting plate is movably disposed on the seat base. The mechanically operated second transmission device is substantially mounted on the first supporting plate and includes a rotation shaft and a first gear. The first gear is operatively coupled to the rotation shaft and mashed with the first rack member. The second supporting plate is mounted on the rotation shaft. When the first transmission device is operated to be stationary, the second transmission device is capable of being operated to rotate the rotation shaft to rotate the second supporting plate with respect to the first supporting plate, and to actuate the first gear to perform intermeshing rotation on the stationary first rack member, such that the second supporting plate, together with the first supporting plate, moves with respect to the seat base along a direction defined by the first rack member.

Accordingly, the vehicle seat adjusting apparatus according to the invention uses two sets of mechanically operated transmission devices to allow the second supporting plate, together with the first supporting plate, to move with respect to the seat base while the second supporting plate rotates. Thus, even constrained by the smaller vehicle space, the vehicle seat adjusting apparatus is capable of smoothly moving the vehicle seat which is mounted on the second supporting plate out of the vehicle to be integrated with the matching wheelchair, such that a disabled employee is able to move in and out of the vehicle conveniently. Besides, the invention requires no additional devices or elements to achieve the simple function of adjusting the vehicle seat forward or backward. In addition, because of the simple structure, lower cost, and easiness of assembling of the vehicle seat adjusting apparatus, users can be provided with cheaper price, much more convenient installation, and operating experience. Moreover, by adjusting the gear ratios of the transmission device, the vehicle seat adjusting apparatus is thus able to be adapted to different kinds of vehicles and has more flexibility in design.

The advantage and spirit of the invention may be understood by the following recitations together with the appended drawings.

BRIEF DESCRIPTION OF THE APPENDED DRAWINGS

DETAILED DESCRIPTION OF THE INVENTION

The invention provides a vehicle seat adjusting apparatus which uses two sets of mechanically operated transmission device to allow the second supporting plate, together with the first supporting plate, to move with respect to the seat base while the second supporting plate rotates. Thus, even constrained by the smaller vehicle space, the vehicle seat adjusting apparatus is capable of smoothly moving the vehicle seat which is mounted on the second supporting plate out of the vehicle to be integrated with the matching wheelchair, such that a disabled employee is able to move in and out of the vehicle conveniently. Besides, the invention requires no additional devices or elements to achieve the simple function of adjusting the vehicle seat forward or backward. In addition, because of the simple structure, lower cost, and easiness of assembling of the vehicle seat adjusting apparatus, users can be provided with cheaper prices, much convenient installation, and operating experience. Moreover, by adjusting the gear ratios of the transmission device, the vehicle seat adjusting apparatus is thus able to adapt to different kinds of vehicles and has more flexibility in design. The spirit and feature of the present invention will be described in detail by the following preferred embodiments.

Figure 1:
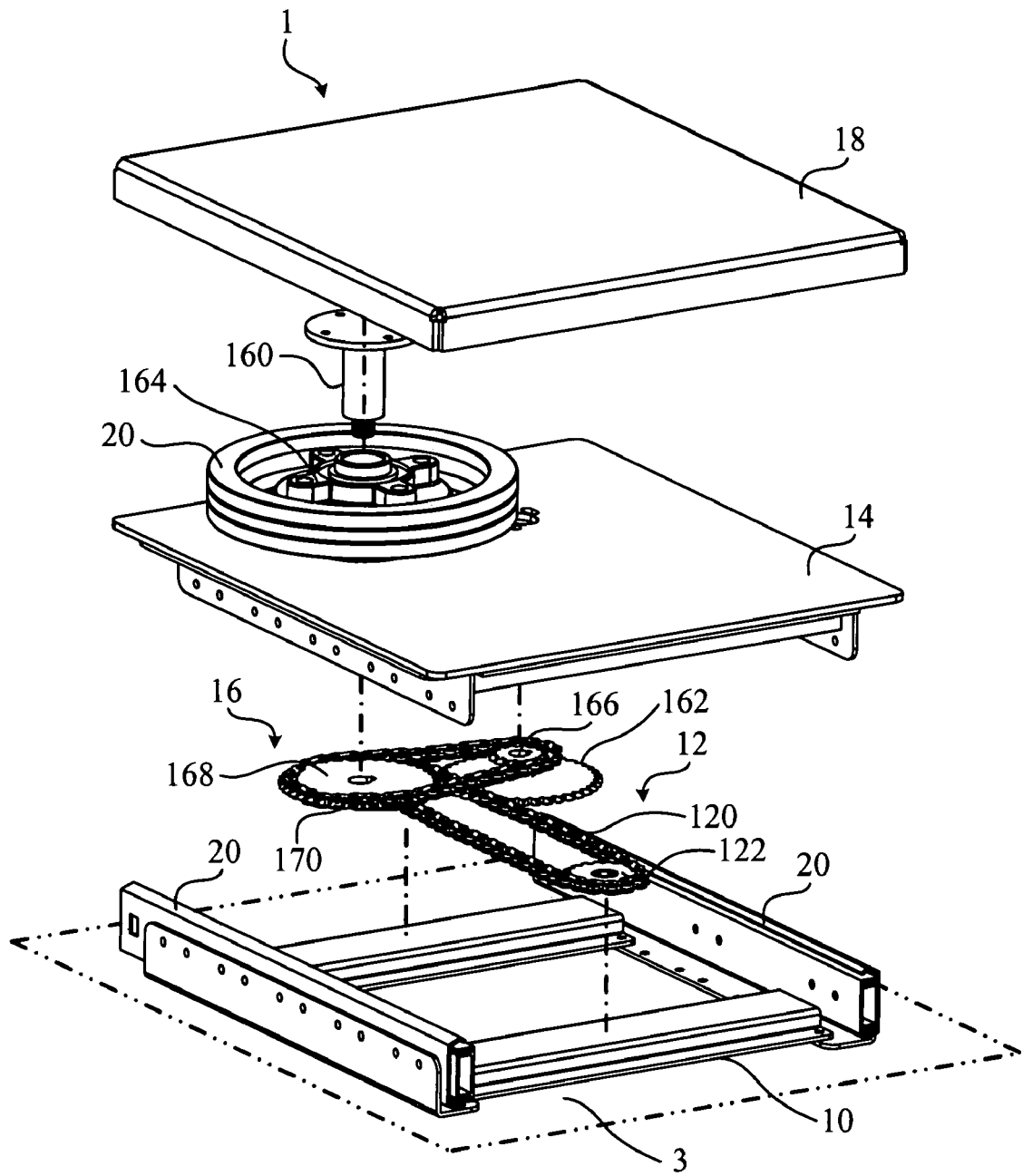
FIG. 1 is an exploded view illustrating a vehicle seat adjusting apparatus according to an embodiment of the invention.
Figure 2:
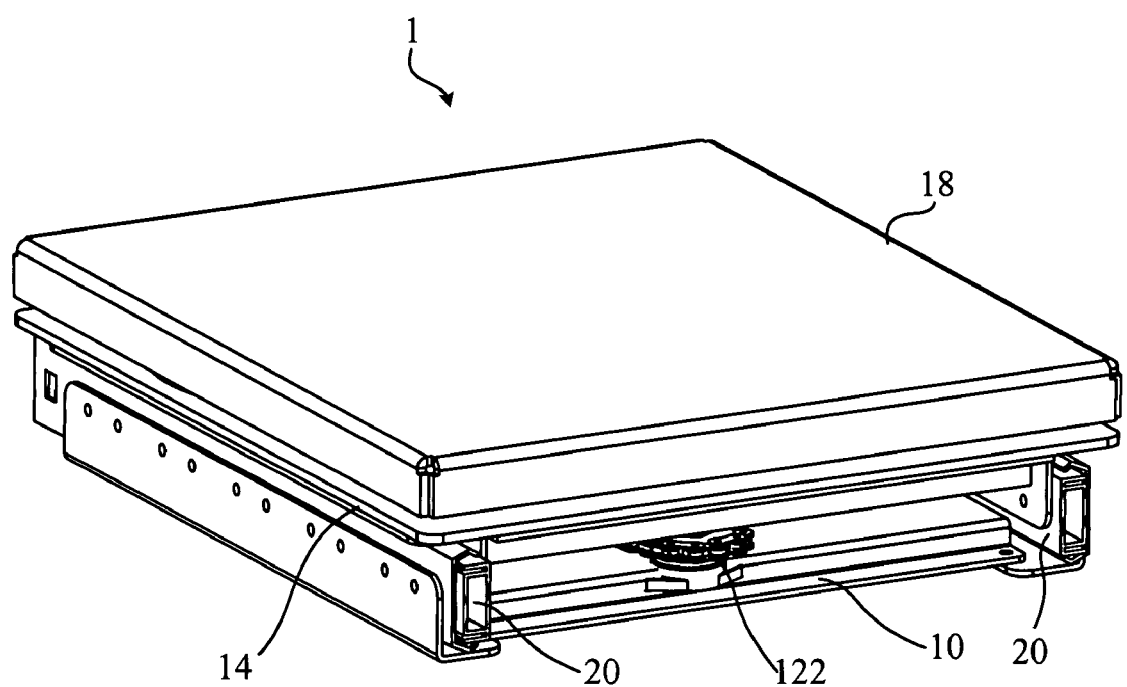
FIG. 2 is an assembly appearance view illustrating the vehicle seat adjusting apparatus in FIG. 1.

Please refer to FIG. 1 and FIG. 2. FIG. 1 is an exploded view illustrating a vehicle seat adjusting apparatus 1 according to an embodiment of the invention. FIG. 2 is an assembly appearance view illustrating the vehicle seat adjusting apparatus 1 in FIG. 1. As shown in FIG. 1 and FIG. 2, the vehicle seat adjusting apparatus 1 includes a seat base 10, a mechanically operated first transmission device 12, a first supporting plate 14, a mechanically operated second transmission device 16, and a second supporting plate 18.

In the embodiment, the seat base 10 is secured to a floorboard of a vehicle (not shown in FIG. 1) therein. The mechanically operated first transmission device 12 is substantially mounted on the seat base 10 and includes an actuating first rack member 120. In a practical application, the first rack member 120 can be a chain or a strap.

The first supporting plate 14 is movably disposed on the seat base 10. In a practical application, the first supporting plate 14 can be movably mounted on the seat base 10 by at least one sliding track 20, as shown in FIG. 1.

As shown in FIG. 1, the mechanically operated second transmission device 16 is substantially mounted on the first supporting plate 14 and includes a rotation shaft 160 and a first gear 162. The first gear 162 is operatively coupled to the rotation shaft 160 and mashed with the first rack member 120.

Figure 3:
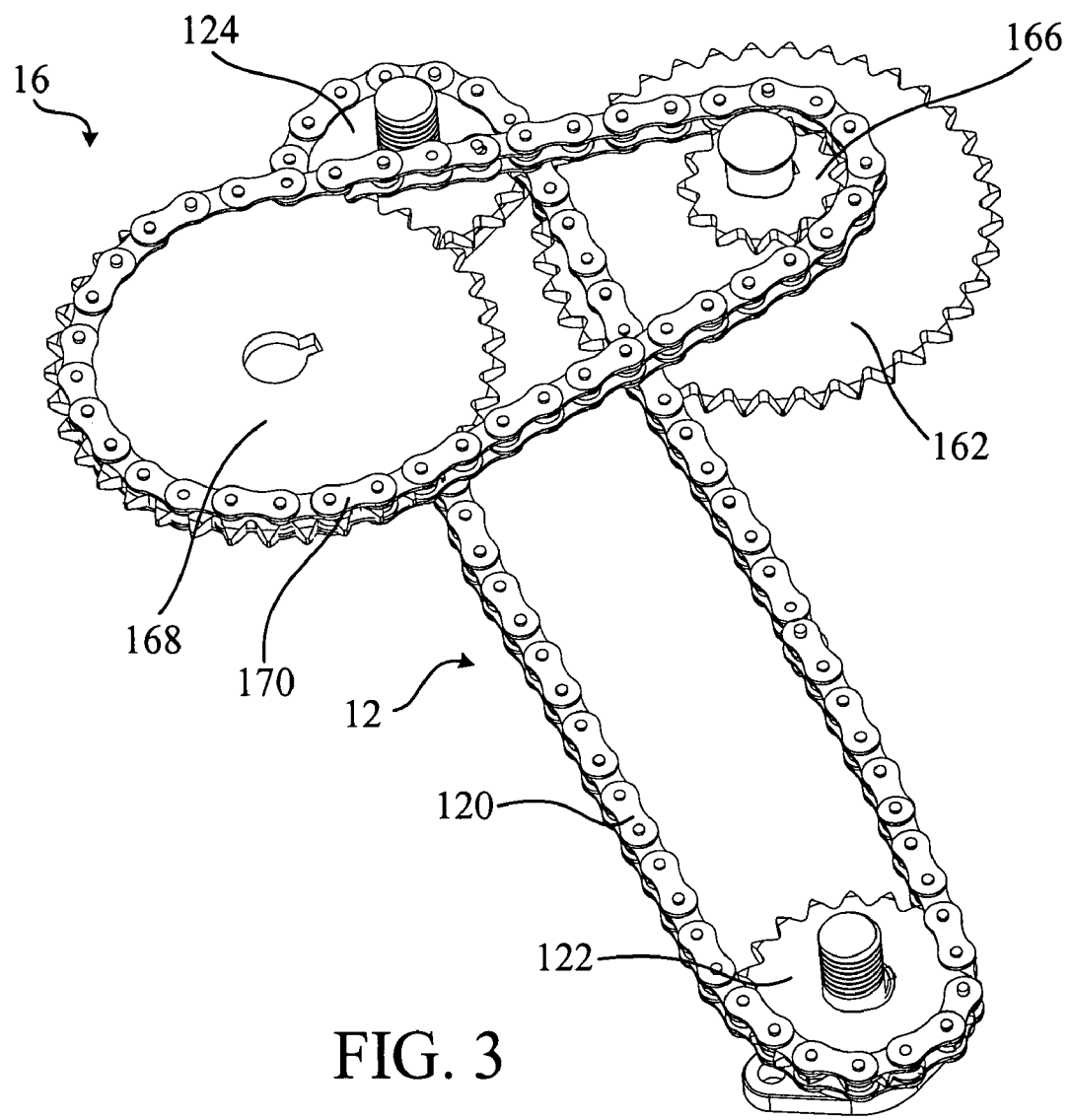
FIG. 3 is a partial appearance view illustrating the first transmission device and the second transmission device from another angle.

Please refer to FIG. 3. FIG. 3 is a partial appearance view illustrating the first transmission device 12 and the second transmission device 16 in another angle. FIG. 3 describes the relative locations of the first transmission device 12 and the second transmission device 16 and the relationship between the first gear 162 meshing and the first rack member 120.

Figure 4:
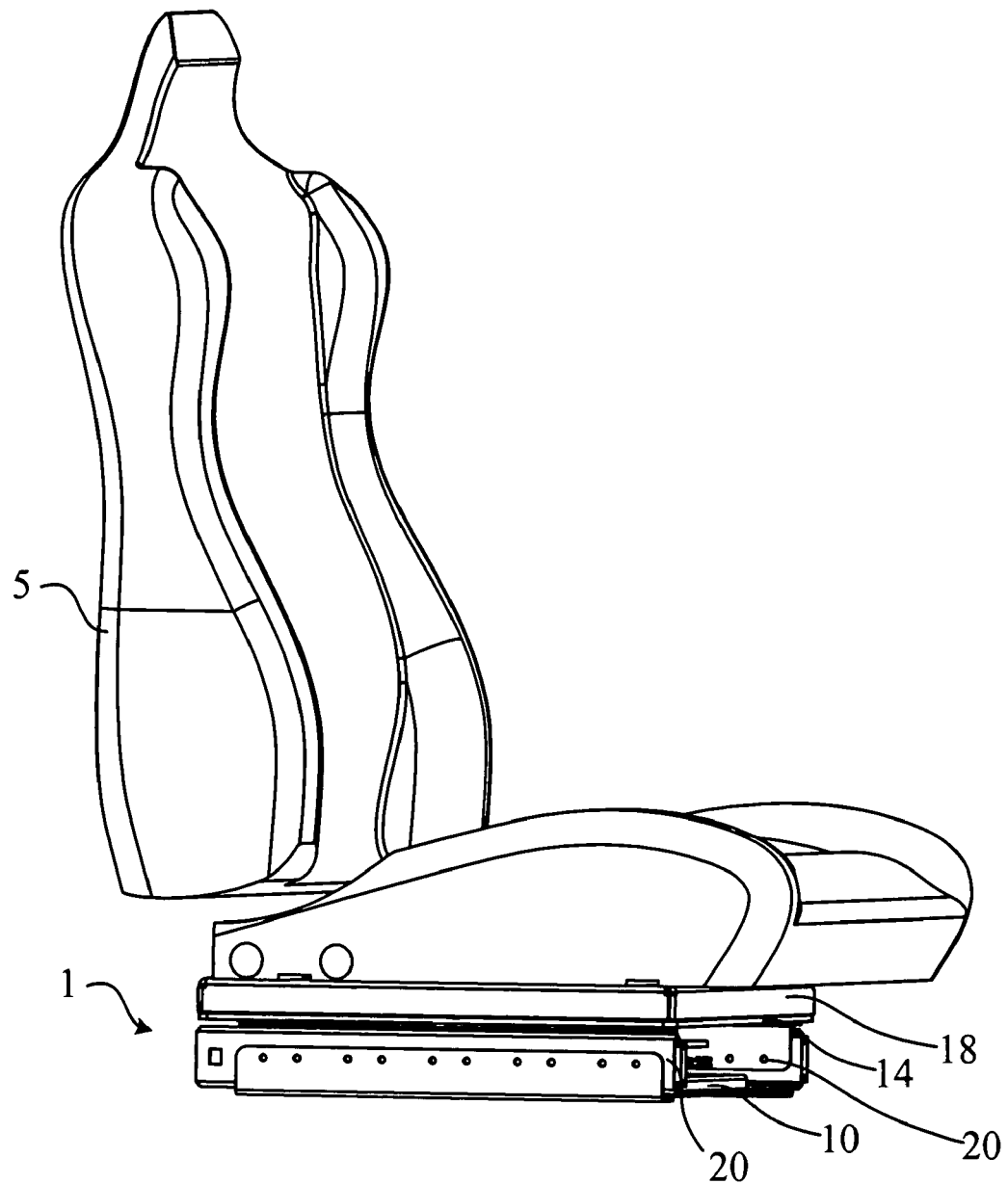
FIG. 4 is a schematic diagram illustrating that the vehicle seat adjusting apparatus includes a vehicle seat.

Please refer to FIG. 4. FIG. 4 is a schematic diagram illustrating that the vehicle seat adjusting apparatus 1 includes a vehicle seat 5. As shown in FIG. 4, the second supporting plate 18 is mounted on the rotation shaft 160. In a practical application, the vehicle seat adjusting apparatus 1 can include a vehicle seat 5, and the vehicle seat 5 is mounted on the second supporting plate 18, as shown in FIG. 4.

Figure 5A:
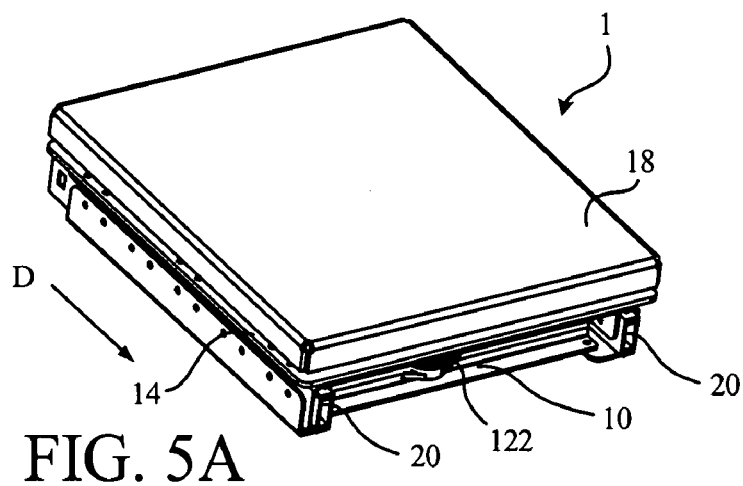
FIG. 5A to FIG. 5C are schematic diagrams illustrating that the second supporting plate of the vehicle seat adjusting apparatus rotates and moves.
Figure 5B:
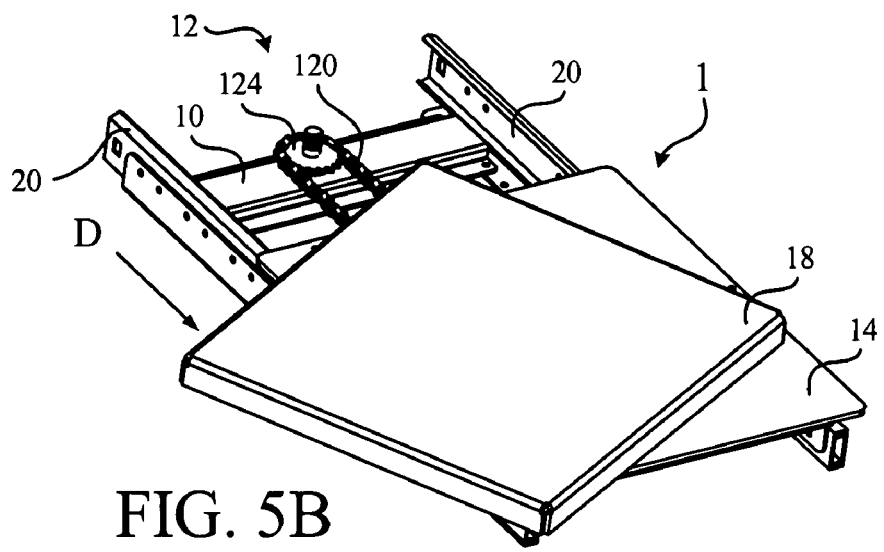
Figure 5C:
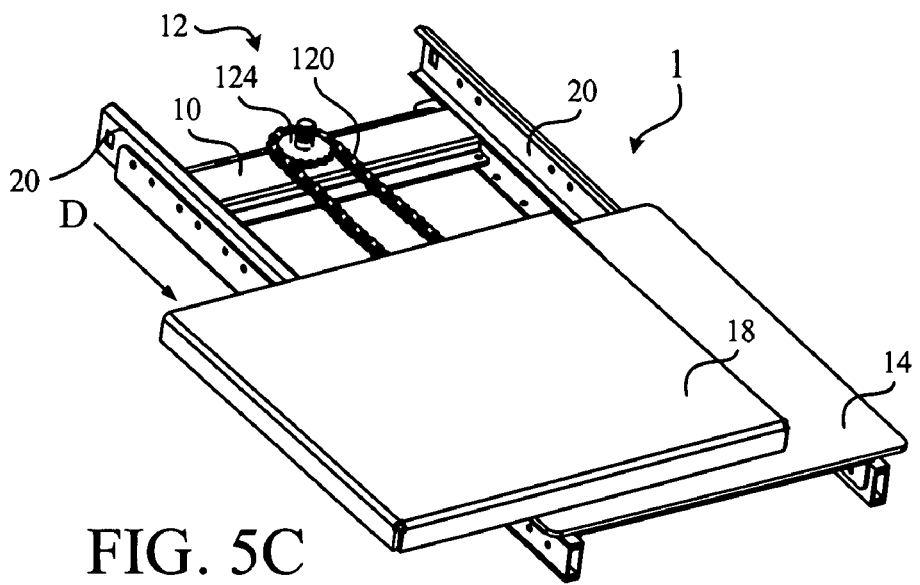

Please refer to FIG. 5A to FIG. 5C. FIG. 5A to FIG. 5C are schematic diagrams illustrating that the second supporting plate 18 of the vehicle seat adjusting apparatus 1 rotates and moves. In the embodiment, the first transmission device 12 is capable of being operated to be stationary. When the first transmission device 12 is operated to be stationary, the second transmission device 16 is capable of being operated to rotate the rotation shaft 160 to rotate the second supporting plate 18 with respect to the first supporting plate 14, and to actuate the first gear 162 to meshably rotate on the stationary first rack member 120, such that the second supporting plate 18 together with the first supporting plate 14 move with respect to the seat base 10 along a direction D defined by the first rack member 120, as shown in FIG. 5A to FIG. 5C.

For instance, when the first transmission device 12 is operated to be stationary, a user can operate the second transmission device 18 to rotate the rotation shaft 160 by rotating the vehicle seat 5 or the second supporting plate 18, by using a dynamic linkage device (not shown in FIG. 5) to rotate the second supporting plate 18, by using an auxiliary power device to rotate the rotation shaft 160, or other ways, so as to make the second supporting plate 18 to rotate with respect to the rotation shaft 160. At the same time, because the first gear 162 is operatively coupled to the rotation shaft 160 and mashed with the first rack member 120, the first gear 162 will be actuated to meshably rotate on the stationary first rack member 120, such that the second supporting plate 18 together with the first supporting plate 14 move with respect to the seat base 10 along a direction D defined by the first rack member 120.

Thus, the supporting plates with the vehicle seat thereon are capable of rotating and moving at the same time to smoothly move the vehicle seat out of the vehicle door to be integrated with a matching wheelchair.

Figure 6A:
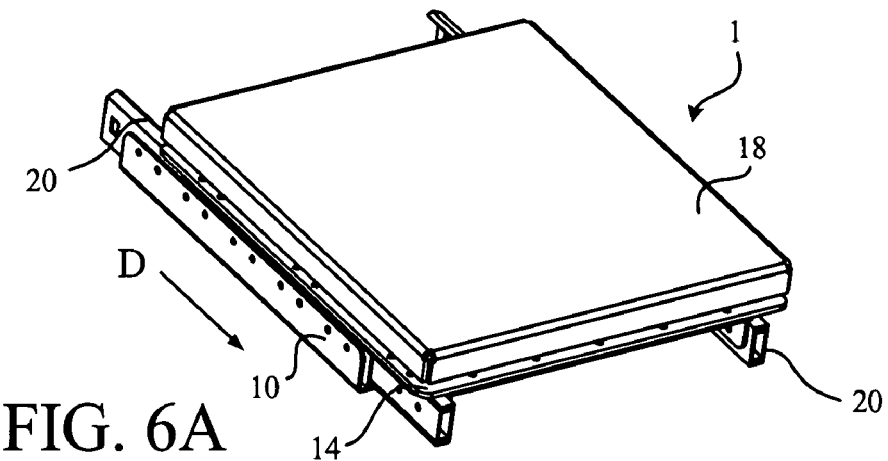
FIG. 6A to FIG. 6C are schematic diagrams illustrating that the second supporting plate of the vehicle seat adjusting apparatus moves without rotating.
Figure 6B:
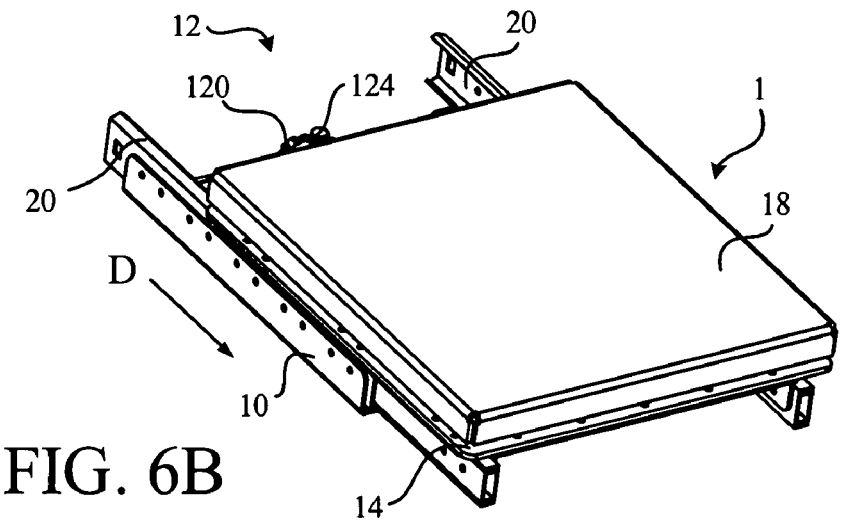
Figure 6C:
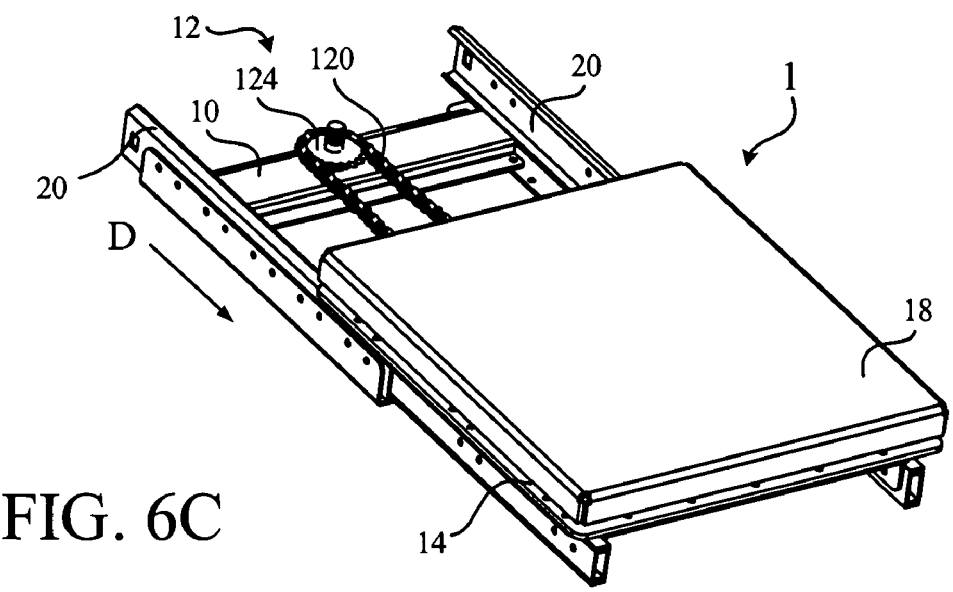

Please refer to FIG. 6A to FIG. 6C. FIG. 6A to FIG. 6C are schematic diagrams illustrating that the second supporting plate 18 of the vehicle seat adjusting apparatus 1 moves without rotating. In a practical application, the second transmission device 16 is capable of being operated to be stationary, and the first transmission device 12 is capable of being actuated at the same time. At this time, the first transmission device 12 is capable of being operated to actuate the first rack member 120 to actuate the stationary second transmission device 16, such that the second supporting plate 18 together with the first supporting plate 14 move with respect to the seat base 10 along a direction D defined by the first rack member 120, as shown in FIG. 6A to FIG. 6C.

For instance, when the second transmission device 16 is operated to be stationary, a user can operate the first transmission device 12 to actuate the first rack member 120 by moving the vehicle seat 5 or the second supporting plate 18, by using a dynamic linkage device (not shown in FIG. 6) to move the second supporting plate 18, by using an auxiliary power device, or other ways. At the same time, because the first gear 162 is operatively coupled to the rotation shaft 160 and mashed with the first rack member 120, the first gear 162 will be actuated to meshably rotate on the stationary first rack member 120, such that the second supporting plate 18, together with the first supporting plate 14, moves with respect to the seat base 10 along a direction D defined by the first rack member 120. Because the first rack member 120 is mashed with the first gear 162, the first gear 162 will be actuated to meshably rotate on the stationary second transmission device 16, such that the second supporting plate 18, together with the first supporting plate 14, moves with respect to the seat base 10 along a direction D defined by the first rack member 120.

In other words, the vehicle seat adjusting apparatus according to the invention is able to not only achieve the function of rotating and moving the supporting plates at the same time to smoothly move the vehicle seat out of the vehicle door, but is also able to achieve the function of adjusting the vehicle seat forward or backward without increasing additional devices or elements.

In a practical application, the vehicle seat adjusting apparatus 1 can further include a thrust bearing 22, and the thrust bearing 22 is disposed between the second supporting plate 18 and the first supporting plate 14, as shown in FIG. 1. The thrust bearing 22 is used for bearing the weight from the second supporting plate 18 (such as the weight of the vehicle seat 5 and the weight of the passengers thereon) to avoid the stress generated by the weight concentrating on the rotation shaft 160 excessively to cause damages to the rotation shaft 160.

In a practical application, as shown in FIG. 1 and FIG. 3, the second transmission device 16 is also able to include a rotation bearing 164 mounted on the first supporting plate 14, a second gear 166, a third gear 168, and an actuating second rack member 170. The rotation shaft 160 is adapted to be fitted with the rotation bearing 164. The second gear 166 is capable of being coaxially coupled to the first gear 162. The third gear 168 is capable of being mounted to the rotation shaft 160. And the second rack member 170 meshes with the second gear 166 and the third gear 168 respectively. In other words, the first gear 162 is able to be operatically coupled to the rotation 160 by the second gear 166, the second rack member 170, and the third gear 168. Like the first rack member 120, the second rack member 170 can be, but not limited to, a chain or a strap.

In a practical application, in order to comply with vehicle spaces and vehicle doors of different kinds of vehicle, the vehicle seat adjusting apparatus 1 can be applied to the different kinds of vehicle by adjusting the relative ratios of the largest diameters of pitch circle of the first gear 162, the second gear 166, and the third gear 168, and by adjusting the relative velocity of rotating and moving of the vehicle seat 5.

In a practical application, as shown in FIG. 1 and FIG. 3, the first transmission device 12 is also able to include a fourth gear 122 and a fifth gear 124. The fourth gear 122 and the fifth gear 124 are rotatably mounted on the seat base 10, and the first rack member 120 meshes with the fourth gear 122 and the fifth gear 124, respectively.

Compared with the prior arts, the vehicle seat adjusting apparatus according to the invention uses two set of mechanically operated transmission device to allow the second supporting plate together with the first supporting plate to move with respect to the seat base while the second supporting plate rotates. Thus, even constrained by the smaller vehicle space, the vehicle seat adjusting apparatus is capable of smoothly moving the vehicle seat which is mounted on the second supporting plate out of the vehicle to be integrated with the matching wheelchair, such that a disabled employee is able to move in and out of the vehicle conveniently. Besides, the invention requires no additional devices or elements to achieve the common function of adjusting the vehicle seat forward or backward. In addition, because of the simple structure, lower cost, and easiness of assembling of the vehicle seat adjusting apparatus, users can be provided with cheaper prices, much more convenient installation, and operating experience. Moreover, by adjusting the gear ratios of the transmission device, the vehicle seat adjusting apparatus is thus able to adapt to different kinds of vehicle and has more flexibility in design.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A vehicle seat adjusting apparatus, comprising:
    a seat base secured to a floorboard of a vehicle therein;
    a mechanically operated first transmission device, substantially mounted on the seat base, comprising an actuating first rack member;
    a first supporting plate movably disposed on the seat base;
    a mechanically operated second transmission device, substantially mounted on the first supporting plate, comprising a rotation shaft and a first gear operatively coupled to the rotation shaft and mashed with the first rack member; and
    a second supporting plate mounted on the rotation shaft;
    wherein when the first transmission device is operated to be stationary, the second transmission device is capable of being operated to rotate the rotation shaft to rotate the second supporting plate with respect to the first supporting plate, and to actuate the first gear to meshably rotate on the stationary first rack member, such that the second supporting plate together with the first supporting plate move with respect to the seat base along a direction defined by the first rack member.

2. The vehicle seat adjusting apparatus of claim 1, wherein when the second transmission device is operated to be stationary, the first transmission device is capable of being operated to actuate the first rack member to actuate the stationary second transmission device, such that the second supporting plate, together with the first supporting plate, moves with respect to the seat base along the direction defined by the first rack member.

3. The vehicle seat adjusting apparatus of claim 1, further comprising a vehicle seat mounted on the second supporting plate.

4. The vehicle seat adjusting apparatus of claim 1, wherein the first supporting plate is movably mounted on the seat base by at least one sliding track.

5. The vehicle seat adjusting apparatus of claim 1, further comprising a thrust bearing disposed between the second supporting plate and the first supporting plate.

6. The vehicle seat adjusting apparatus of claim 1, wherein the first rack member is a chain or a strap.

7. The vehicle seat adjusting apparatus of claim 1, wherein the second transmission device also comprises a rotation bearing mounted on the first supporting plate, a second gear, a third gear, and an actuating second rack member, the rotation shaft is adapted to be fitted with the rotation bearing, the second gear is coaxially coupled to the first gear, the third gear is mounted to the rotation shaft, and the second rack member meshes with the second gear and the third gear, respectively.

8. The vehicle seat adjusting apparatus of claim 7, wherein the second rack member is a chain or a strap.

9. The vehicle seat adjusting apparatus of claim 1, wherein the first transmission device also comprises a fourth gear and a fifth gear rotatably mounted on the seat base, the first rack member meshes with the fourth gear and the fifth gear, respectively.

* * * * *